K. G. MOLTZNER.
FRUIT CUTTING AND PITTING MACHINE.
APPLICATION FILED MAR. 1, 1916.

1,223,343.

Patented Apr. 17, 1917.
3 SHEETS—SHEET 1.

WITNESSES:

INVENTOR
Karl G. Moltzner.
BY
ATTORNEY

K. G. MOLTZNER.
FRUIT CUTTING AND PITTING MACHINE.
APPLICATION FILED MAR. 1, 1916.
1,223,343.
Patented Apr. 17, 1917.
3 SHEETS—SHEET 2.
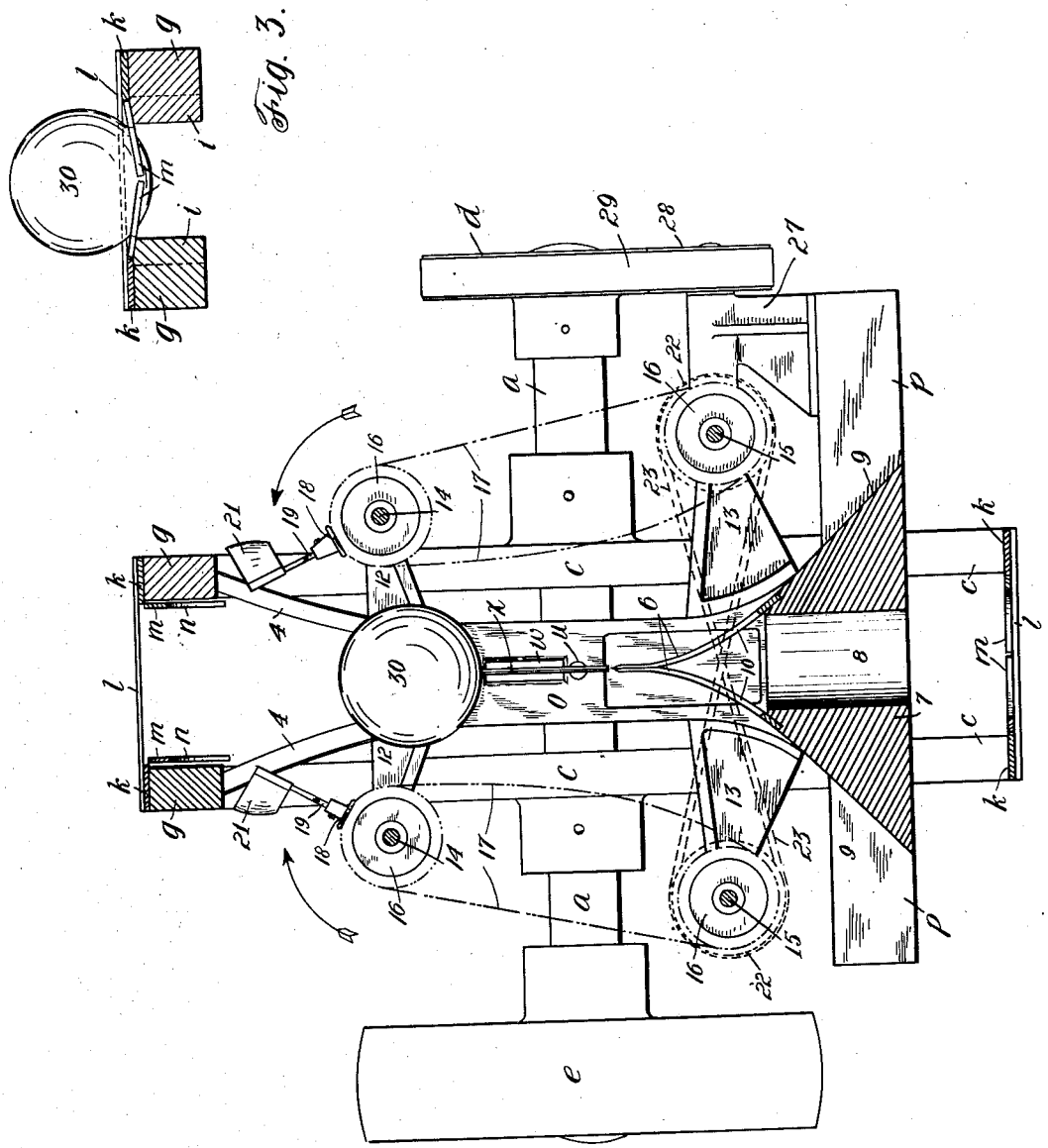
WITNESSES:
INVENTOR
Karl G. Moltzner,
BY
ATTORNEY

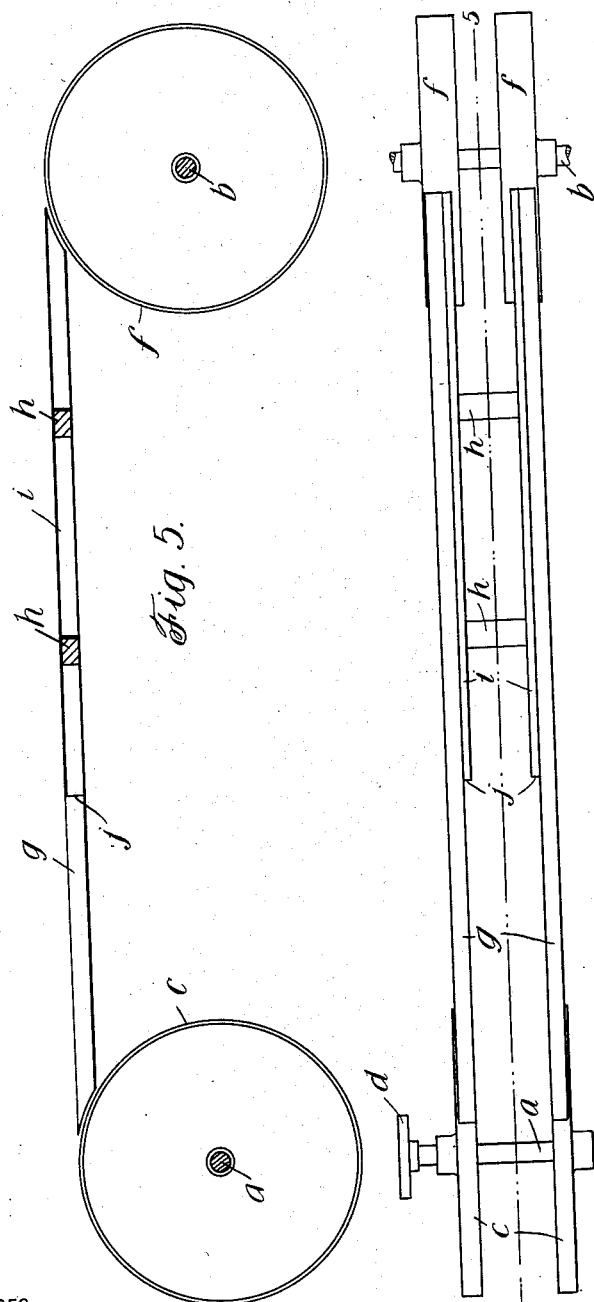

UNITED STATES PATENT OFFICE.

KARL G. MOLTZNER, OF PORTLAND, OREGON.

FRUIT CUTTING AND PITTING MACHINE.

1,223,343.  Specification of Letters Patent.  Patented Apr. 17, 1917.

Application filed March 1, 1916. Serial No. 31,546.

*To all whom it may concern:*

Be it known that I, KARL G. MOLTZNER, a citizen of the United States, and a resident of the city of Portland, county of Multnomah, State of Oregon, have invented a new and useful Improvement in Fruit Cutting and Pitting Machines, of which the following is a specification.

This invention relates generally to apparatus for handling fruit, and has particular reference to machines for stoning peaches, apricots and other similar fruits, or for shelling nuts, such as almonds, or for any other work of a similar character. The delicate structure of the peach requires that it shall be very carefully handled so that the fruit will not be bruised in any way, and especially is this necessary in preparing fruit for canning purposes. In preparing fruit for canning or drying purposes, it is first divided into two parts and the stone removed. This work is tedious and slow, and oftentimes a considerable portion of the crop is lost because of the inability to handle it properly.

One of the main objects of my invention is to provide a machine in which the fruit may be placed, and which will so operate that the fruit will be divided in a diametrical plane, the two halves separated, and the stone removed from between these halves. Another object is to provide a high speed automatic machine in which this work may be carried on rapidly and with a minimum of skilled labor.

In the accompanying drawings:

Fig. 2 is a transverse vertical section of the machine taken approximately on the line 2—2 of Fig. 1;

Fig. 3 is a transverse sectional detail taken on the line 3—3 of Fig. 1;

Fig. 4 is a smaller-scale plan view of the trackway and pulleys which form a part of the fruit delivering apparatus; and Fig. 5 is a longitudinal section of the same taken on the line 5—5 of Fig. 4.

Figure 1:
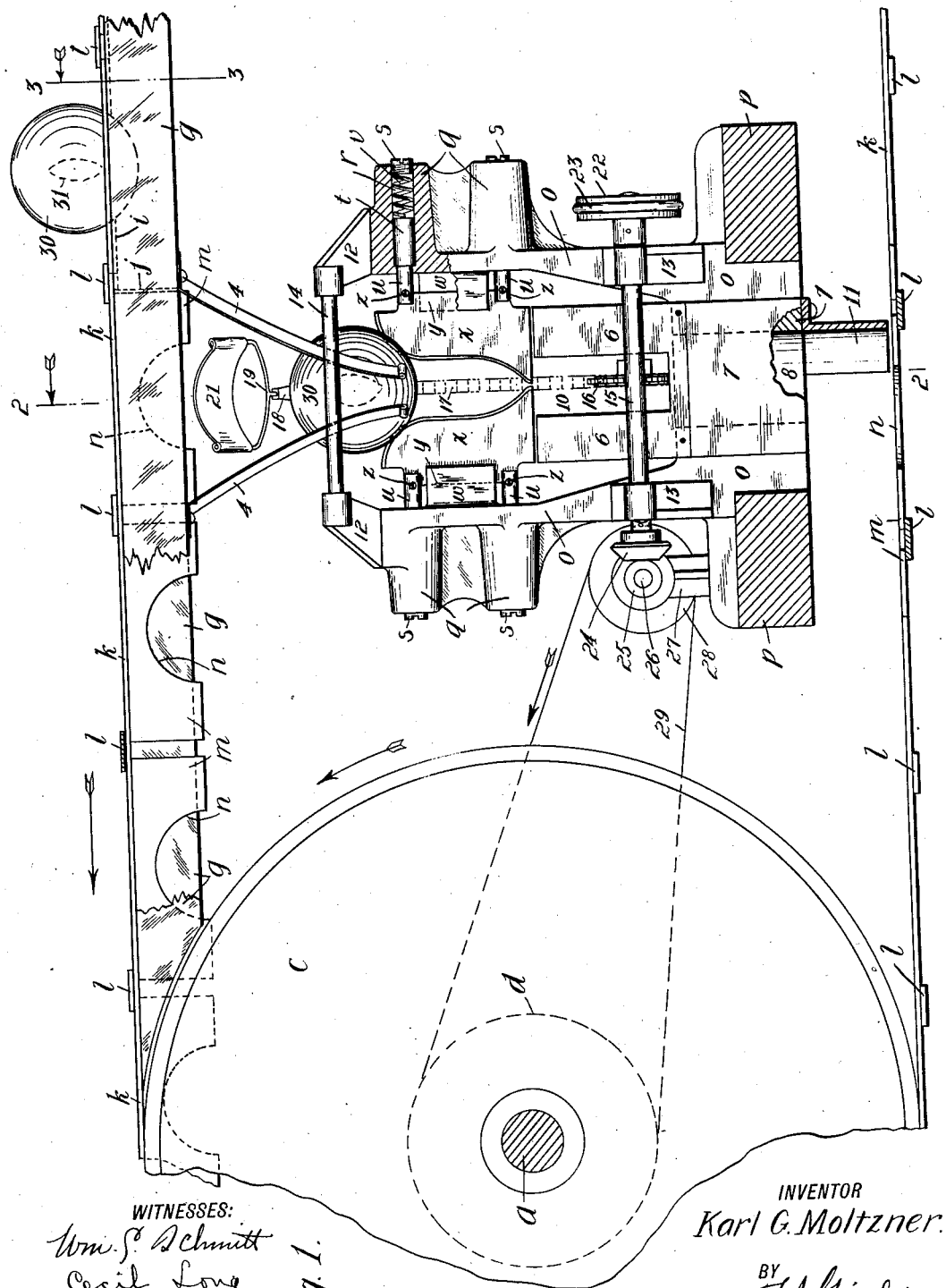
Figure 1 is a fragmental side elevation, partly in section, of a machine constructed according to the principles of my invention.

I shall first describe the fruit delivery apparatus, by means of which the fruit is delivered singly at periodic intervals to that portion of the machine in which the halving and stoning operation takes place.

$a$ and $b$ are parallel rotatable shafts, the bearings of which are omitted in these drawings. Rigidly mounted on the shaft $a$ are the pulleys $c$, $d$, $e$, and rigidly mounted on the shaft $b$ are the pulleys $f$. The pulleys $f$ are made with wider faces than the pulleys $c$, and their inner sides spaced apart a distance smaller than the space between the corresponding sides of the pulleys $c$. A trackway extends between the pulleys $c$ and $f$, and is tangent to the upper portions of these pulleys. Said trackway comprises a pair of longitudinal ways $g$, located relatively in the position shown in Figs. 4 and 5. Said ways $g$ are spaced apart by the struts $h$, the supporting elements for said trackway being omitted for the purpose of clearness. On the inner faces of the ways $g$, on the right end of the trackway, are the beveled portions $i$, which slope inwardly, as shown in Fig. 3, and terminate abruptly at $j$. See Figs. 1, 4 and 5. An endless carrier is adapted to encompass the pulleys $c$ and $f$, the upper portion of said carrier being supported by and adapted to ride on the ways $g$. Said endless carrier comprises a pair of parallel belts $k$, connected at intervals by the transverse strips $l$. Flexibly hinged to the belts $k$ are a plurality of pairs of companion gates $m$. The hinges of the gates are adapted to permit them to swing from the position shown in Fig. 3 to the position shown in Fig. 2, when they are not supported by any other means. Furthermore, the ends of each pair of gates underlie adjacent transverse strips $l$, so that the gates on the lower portion of the endless carrier will assume the position shown in the bottom of Fig. 1. Each gate is provided with a semi-cylindrical cut-out portion $n$, and when these gates are supported on the beveled portions $i$ of the ways, the fruit placed thereon will be securely seated within the cut-out portions $n$ and be prevented from rolling or otherwise being displaced. As the endless carrier moves toward the left, as indicated by the arrow in Fig. 1, the gates, and fruit thereon, will be supported as indicated in Fig. 3, until they pass the point $j$, at which time the gates will swing open to the position shown in Fig. 2, and the peach will be delivered downward between the ways to that portion of the machine in which the halving and stoning operation takes place.

The device for cutting and stoning the peach is located beneath the trackway, its center line being coincident with the center line along which the peach will drop. This machine is fully shown in Figs. 1 and 2 and is constructed substantially as follows:

The parallel and opposite upright standards *o* are rigidly supported on transverse frame members *p*. Said standards are provided at their upper ends with hubs *q*. Each hub is made with a longitudinal bore *r*, the outer end of which is threaded and closed by a screw-plug *s*. The inner end of said bore is reduced in cross-section. A cylindrical pin *t* is slidably mounted in the bore *r*, and said pin is made with a reduced end *u* which projects through the reduced portion of the bore *r* toward the center line of the machine. An expansion coil spring *v*, inserted behind the pin *t*, is adjustably retained in position by the screw plug *s*, and the action of this spring normally projects the pin to the position shown in Fig. 1. The standards *o* are further provided with vertical guideways *w*, located in alinement with the projecting ends *u* of the pins. Vertical blades *x* are shaped substantially as shown in Fig. 1, and are each provided with a tongue *y* adapted to bear in the guideways *w*. Said tongues are detachably secured to the reduced ends *u* of the pins *s* by the set screws *z*. When the pins *t* are in normal position, as shown in Fig. 1, the toes of the blades will almost touch each other, while the vertical edges of the blades will be spaced apart a distance slightly greater than the transverse diameter of the stone 31 of the peach 30. When the peach is delivered downward from the collapsed gates, it will fall to the position shown in Figs. 1 and 2, being partially supported in this position by the blades *x*, and partially by flat, convergent springs 4, which are supported beneath the trackway.

It will be seen by an inspection of Fig. 1, that the blades *x* will have a resilient, yielding bearing which permits them to separate laterally when proper pressure is imposed on them, but which will also cause them to resume normal position when such pressure is removed.

Located beneath the blades *x* are rigidly mounted the divergent separator plates 6. Said plates converge to a point a little distance below the toes of the blades *x*, and their common upper end is made with a horizontal knife edge. These plates are removably mounted on a base member 7, which is supported between the standards *o*, said base member being made with a central, vertical bore 8 and inclined side faces 9, which form a continuation of the plate surfaces. The separator plates 6 are provided with centrally located cut-out portions 10, which are in alinement with the vertical center line of the bore 8. Furthermore, there is attached to the lower face of the base-member 7, and concentric with the bore 8, a sweeper flange 11, which extends to a plane slightly above the endless carrier.

Brackets 12, 13 are rigidly mounted on the standards *o*, in the positions shown in Fig. 2, and rotatably journaled in these brackets are the parallel shafts 14, 15. Fixed on these shafts are sprocket wheels 16, and each pair of said sprockets are connected by a chain drive 17. The chain drives 17 are each made with special links 18, adapted to rigidly support laterally extending arms 19, of which but one is shown on each chain in Fig. 2. Each arm 19 is made with a yoked end, and between the arms of the yoke is supported a concave saddle 21, adapted to seat on the peach and, by the movement of the chain, carry the peach downward through the blades *x* and separator plates 6. The saddles 21 are adapted to work in pairs, and each one is made of soft, pliable material which will readily adjust itself to the contour of the peach and exert an even pressure on the latter, so as to prevent bruising or otherwise injuring the same. Also fixed on the outer ends of the shafts 15 are the pulleys 22, which are connected by a crossed drive belt 23 by means of which the chains 17 are driven in the directions indicated by the arrows in Fig. 2.

The lower, right-hand shaft 15 is the power shaft. Fixed on this power shaft is a miter-gear 24, which is in mesh with and driven by a miter-gear 25, the latter being fixed on an auxiliary shaft 26, supported in a bearing 27. A pulley 28 is also fixed on the shaft 26, and a drive belt 29 connects the pulley 28 with the pulley *d*, on the shaft *a*. The latter is driven through the medium of the pulley *e*, which may be connected up with any convenient source of power, such as an electric or gas motor, not shown herein.

The general operation of this device is as follows:

Assuming that peaches are to be the fruit operated upon, the operator will stand near the right end of the machine and place the peaches 30 in position upon the closed gates *m*. The travel of the carrier will cause the gates to collapse when they pass beyond the point *j*, and the peaches 30 will drop to the position shown in Figs. 1 and 2. A pair of saddles 21 will then seat themselves on the peach and force it downward. The blades *x* will then cut completely around the stone 31, and further movement of the peach downward will cause the halves thereof to separate and be delivered on opposite sides of the machine to trays or other convenient receptacles. The stone thus freed will drop vertically downward through the cut-out portions 10 of the plates 6, and the bore 8, and from the machine. The sweeper flange 11 prevents the stones from being carried along on the lower portion of the endless carrier, but will sweep them off through the cut-out portions n of the gates, into some convenient receiving device. The moving parts are so timed that all coöperative elements will work in unison, and the machine may be geared so as to operate at any speed desired.

I claim:

1. In a device of the character described, the combination of fruit holding means, coöperating fruit cutting knives yieldingly mounted beneath the fruit holder and laterally separable, divergent separator members rigidly mounted beneath the knives and provided with a centrally located opening, and an endless carrier mounted adjacent the knives and provided with members adapted to carry fruit down between said knives.

2. In a device of the character described, the combination of fruit holding means, coöperating fruit cutting knives yieldingly mounted beneath the fruit holder and laterally separable, divergent separator members rigidly mounted beneath the knives and provided with a centrally located opening, an endless carrier mounted adjacent the knives and provided with a plurality of saddles adapted to carry fruit down between said knives, and driving means therefor.

3. In a device of the character described, the combination of a resilient expansible fruit holder, coöperating fruit-cutting knives yieldingly mounted beneath the fruit holder and laterally separable, divergent separator members rigidly mounted beneath the knives and provided with a centrally located opening, movable fruit engaging means adapted to carry fruit down between said knives, and fruit delivering means for delivering fruit to the holder.

4. In a device of the character described, the combination of a resilient expansible fruit holder, coöperating fruit-cutting knives yieldingly mounted beneath the fruit holder and laterally separable, divergent separator members rigidly mounted beneath the knives and provided with a centrally located opening, movable fruit engaging means adapted to carry fruit down between said knives, fruit delivering means for delivering fruit to the holder at periodic intervals, and fruit delivering means adapted to work in unison with the means for carrying the fruit between the knives.

5. In a device of the character described, the combination of a resilient expansible fruit holder, coplanar fruit-cutting knives yieldingly mounted beneath the fruit holder and laterally separable, divergent separator members rigidly mounted beneath the knives and provided with a centrally located opening, movable fruit engaging means adapted to carry fruit down between said knives, fruit delivering means for delivering fruit to the holder at periodic intervals, driving means for said fruit delivering means, and connections between said fruit delivering means and the fruit engaging means so timed that these parts will operate in unison.

6. In a device of the character described, coöperating fruit-cutting knives yieldingly mounted and laterally separable, divergent separator members rigidly mounted beneath the knives and provided with a centrally located opening, movable fruit engaging means adapted to carry fruit down between said knives, fruit delivering means for delivering fruit to the knives at periodic intervals, driving means for said fruit delivering means, and connections between said fruit delivering means and the fruit engaging means so timed that these parts will operate in unison.

7. In a device of the character described, coöperating fruit-cutting knives yieldingly mounted and laterally separable, divergent separator members rigidly mounted beneath the knives and provided with a centrally located opening, movable fruit engaging means adapted to carry fruit down between said knives, fruit delivering means for delivering fruit to the knives at periodic intervals, said means comprising an endless carrier provided with a plurality of collapsible fruit carrying elements, means adapted to hold said carrying elements closed for a portion of their travel and further adapted to allow said elements to collapse at a certain point of their travel so as to cause the fruit to be delivered therefrom to the knives, driving means for said endless carrier, and connections between said endless carrier and the fruit engaging means so timed that these parts will operate in unison.

KARL G. MOLTZNER.